United States Patent Office 2,883,375
Patented Apr. 21, 1959

2,883,375

PREPARATION OF ALKALI METAL SALTS OF SULFOETHYL STARCH

Mack Francis Fuller, Woodbury, N.J., assignor to E. I. du Pont de Nemours and Company, Wilmington, Del., a corporation of Delaware No Drawing. Application June 25, 1956
Serial No. 593,329

1 Claim. (Cl. 260—233.3)

The present invention relates to a process for the preparation of starch ethers. More particularly, this invention relates to the preparation of water-soluble sulfoalkyl ethers of starches.

This application is a continuation-in-part of my prior application Serial No. 319,175, filed November 6, 1952, now abandoned.

Starch has been reacted with haloalkyl sulfonic acids or salts thereof in the presence of free alkali and water to form a water-soluble alkali metal salt of the sulfoalkyl ether of starch. When sufficient water is present to provide a medium for efficient agitation and intermingling of the reactants, a rubbery mass forms which renders further etherification and processing extremely difficult. Since the sulfoalkyl ethers of starch are useful as thickening agents in many fields such as textiles and paper manufacture, their economic production is of considerable commercial interest.

It is an object of the present invention to provide an improved process for the preparation of sulfoalkyl ethers of starch. A further object of the present invention is to provide a process for the preparation of sulfoalkyl ethers of starch which are water-soluble, have a suitable physical form, and are of a high degree of purity. Additional objects will become apparent as the invention is further described.

I have found that the foregoing objects may be attained when I react finely divided starch with a haloalkyl sulfonic acid or the alkali salt thereof in the presence of free alkali in a reaction medium of water and ethanol, isopropanol or t-butanol. Of these three alcohols, isopropanol and t-butanol give by far the most superior results. The yields achieved with an ethanol slurry are by comparison, relatively low. I have found that I can improve the results in the ethanol medium by the addition of a water immiscible organic liquid such as benzene or toluene into the reaction medium. However, even with the use of one of these additives, the yields are still inferior to those obtained when isopropanol or t-butanol is used. The reaction is carried out at an elevated temperature, i.e., between 50° and 85° C., and with efficient agitation. The starch may be dried before introduction into the reaction zone, or used directly with the water normally found in the commercial product.

By the use of the reaction medium described above, a large quantity of liquid can be present during the etherification of the starch, thus permitting the formation of an easily agitated slurry with the corresponding uniform dispersion of the reactants. I have found that this result cannot be achieved by the use of an alcohol medium alone or by the use of a water medium alone. In the latter case, water which is just sufficient to maintain the reactants at the concentrations necessary for etherification will cause the starch to swell and form the rubbery mass referred to in paragraph 3, above. If additional water is added, sufficient to alleviate this condition, the reactants are diluted to a point at which the desired etherification reaction does not occur. Moreover, the presence of excess water causes hydrolysis to take place to the detriment of the desired etherification. In the case of a plain alcohol medium a distinct disadvantage is encountered in that alcohol alone will not swell the starch to open the starch structure. Hence the reaction occurs only on the surface of the starch, and the product formed has very poor solubility properties. By the use of the preferred water-alcohol medium of my invention, a two-phase liquid sysem is formed when the named reactants are present. The water-rich phase dissolves the bulk of the reactants and brings them into contact with the starch after it has swelled open, while the chief function of the water-lean, reagent-lean alcohol-rich phase is to serve as a dispersion and heat transfer medium which will not permit gumming of the highly swollen starch and starch ether.

The following examples fully illustrate the present process, which is, however, not limited to the specific embodiments set forth therein. In the examples, the parts given are by weight. Throughout this description and in the examples, the following definitions are applicable.

The theoretical degree of etherification (T.D.E.) represents the number of mols of the etherifying agent used per anhydroglucose unit of starch.

The degree of etherification (D.E.) represents the average number of hydroxyl groups per anhydroglucose unit of starch which have actually been substituted in the reaction.

The reaction efficiency is expressed as percentage and represents the ratio of the degree of etherification to the theoretical degree of etherification.

The purity of the product is indicated by a determination of the alkali halide present after the reaction has been completed and the product washed thoroughly.

*Example 1*

58.5 parts of potato starch containing 15% moisture together with 55.5 parts of sodium sulfoethyl chloride having a purity of 93% were suspended in 510 parts of 97% isopropanol. The resulting slurry was vigorously agitated and 32 parts of 97% flake caustic soda dissolved in 30 parts of water were added to the slurry and the temperature of this mixture held at 30° C. for 15 minutes with continued agitation. The slurry was then heated to the reflux temperature of the liquid (about 80° C.) and agitation continued for one hour. At the conclusion of the refluxing, the slurry was cooled below 40° C. and neutralized with acetic acid and the liquid medium drained off. The product was first washed with 80% methanol and then with anhydrous methanol and thereafter dried in air at 60–65° C. The product was similar in appearance to the original starch and was completely soluble in water. The sodium chloride content was 0.08% and the viscosity of a 2% solution in water was 1200 centipoises. The reaction efficiency was 62% based on a T.D.E. of 1.00 and a D.E. of 0.2. The liquid/starch ratio was 11.1, and the alcohol/water ratio was 9.0 at the beginning of the reaction, all the ratios being by weight.

*Example 2*

58.5 parts of potato starch containing 15% moisture together with 93.25 parts of sodium sulfoethyl chloride having a purity of 55% were suspended in 706 parts of 97% isopropanol. The resulting slurry was vigorously agitated and 32 parts of 97% flake caustic soda dissolved in 44 parts of water were added to the slurry and the temperature of this mixture held at 30° C. for 15 minutes with continued agitation. The slurry was then heated to the reflux temperature of the liquid (about 80° C.) and agitation continued for one hour. At the conclusion of the refluxing, the slurry was cooled below 40° C. and neutralized with acetic acid and the liquid medium drained off. The product was first washed with 80% methanol and then with anhydrous methanol and thereafter dried in air at 60-65° C. The product was similar in appearance to the original starch and was completely soluble in water. The sodium chloride content was less than 0.1%, and the viscosity of a 2% solution in water was 490 centipoises. The reaction efficiency was 57% based on a T.D.E. of 1.00 and a D.E. of 0.57. The liquid/starch ratio was 15, and the alcohol/water ratio was 9.0 at the beginning of the reaction, all the ratios being by weight.

*Example 3*

58.5 parts of potato starch containing 15% moisture together with 93.25 parts of sodium sulfoethyl chloride having a purity of 55% were suspended in 938.5 parts of 97% isopropanol. The resulting slurry was vigorously agitated and 32 parts of 97% flake caustic soda dissolved in 61.5 parts of water were added to the slurry and the temperature of this mixture held at 30° C. for 15 minutes with continued agitation. The slurry was then heated to the reflux temperature of the liquid (about 80° C.) and agitation continued for one hour. At the conclusion of the refluxing, the slurry was cooled below 40° C. and neutralized with acetic acid and the liquid medium drained off. The product was first washed with 80% methanol and then with anhydrous methanol and thereafter dried in air at 60-65° C. The product was similar in appearance to the original starch and was completely soluble in water. The sodium chloride content was less than 0.1%, and the viscosity of a 2% solution in water was 250 centipoises. The reaction efficiency was 47% based on a T.D.E. of 1.00 and a D.E. of 0.47. The liquid/starch ratio was 20, and the alcohol/water ratio was 9.0 at the beginning of the reaction, all the ratios being by weight.

*Example 4*

117.5 parts of potato starch containing 15% moisture together with 33 parts of sodium sulfoethyl chloride having a purity of 93% were suspended in 344 parts of 97% isopropanol. The resulting slurry was vigorously agitated and 32 parts of 97% flake caustic soda dissolved in 30 parts of water were added to the slurry and the temperature of this mixture held at 30° C. for 15 minutes with continued agitation. The slurry was then heated to the reflux temperature of the liquid (about 80° C.) and agitation continued for one hour at this temperature. At the conclusion of the refluxing, the slurry was cooled below 40° C. and 80 parts of methanol was added and the mixture neutralized with acetic acid and the liquid medium drained off. The product was washed with 80% methanol and with anhydrous methanol and dried in air at 60-65° C. The product was similar in appearance to the original starch and was completely water-soluble. The sodium chloride content was 0.12% and the viscosity of a 2% solution in water was 800 centipoises. The reaction efficiency was 77%, based on a T.D.E. of 0.30 and an actual D.E. of 0.23. The liquid/starch ratio was 3.9, and the alcohol/water ratio was 5.8 at the beginning of the reaction, the ratios being by weight.

*Example 5*

117.5 parts of potato starch containing 15% moisture together with 27.5 parts of sodium sulfoethyl chloride having a purity of 93% were suspended in 172 parts of 97% isopropanol. The resulting slurry was vigorously agitated and 25 parts of flake sodium hydroxide dissolved in 23.5 parts of water were added to the slurry and the temperature of this mixture held at 30° C. for 15 minutes with continued agitation. The slurry was then heated to the reflux temperature of the liquid (about 80° C.) and agitation continued for one hour at this temperature. After the refluxing the slurry was cooled below 40° C. and 160 parts of methanol was added and the mixture neutralized with acetic acid and the liquid drained off. The product was washed with 80% methanol and with anhydrous methanol and dried in air at 60-65° C. The appearance of the water-soluble product was similar to that of the original starch. The sodium chloride content was 0.33% and the viscosity of a 2% solution in water was 1250 centipoises. The reaction efficiency was 44% based on a T.D.E. of 0.25 and an actual D.E. of 0.11. The liquid/starch ratio was 2.1, and the alcohol/water ratio was 3.5 at the beginning of the reaction, the ratios being by weight.

*Example 6*

58.5 parts of potato starch containing 15% moisture together with 26 parts of sodium sulfoethyl chloride having a purity of 93% were suspended in 215 parts of 92.3% S.D. 2B ethanol (specially denatured alcohol: 0.5 gallon of benzene per 100 gallons 190° proof ethyl alcohol). The resulting slurry was agitated vigorously and 16 parts of flake sodium hydroxide dissolved in 49 parts of water were added to the slurry and the temperature of this mixture held at 30° C. for 15 minutes with continued agitation. The slurry was then heated to the reflux temperature of the liquid (about 79° C.) and agitation continued for two hours at this temperature. After refluxing, the slurry was cooled below 40° C. and the mixture neutralized with acetic acid and the liquid drained off. The product was washed with 80% S.D. 2B ethanol and with anhydrous methanol and dried. The product had the appearance of the original starch and was completely soluble in water. The sodium chloride content was 1.22% and the viscosity of a 2% solution in water was 358 centipoises. The reaction efficiency was 8% based on a T.D.E. of 0.50 and an actual D.E. of 0.04. The liquid/starch ratio was 5.5 and the alcohol/water ratio was 2.7 at the beginning of the reaction, the ratios being by weight.

*Example 7*

40 parts of potato starch containing 3% moisture were suspended in 220 parts of a 50-50 mixture of anhydrous ethanol and benzene and 10 parts of flake sodium hydroxide dissolved in 23 parts of water and the slurry agitated at 30° C. for 30 minutes. To this mixture 26 parts of sodium sulfoethyl bromide having a purity of 97% were added and the slurry stirred at 30° C. for 15 minutes. Then the temperature was increased to reflux temperature (about 65° C.) and the mixture agitated at this temperature for 4 hours. After refluxing the slurry was cooled and the mixture neutralized with acetic acid and the liquid drained off. The product was washed with 80% methanol and with anhydrous methanol and dried. The product was similar in appearance to the original starch and was completely water-soluble. It contained 0.74% sodium bromide and a 2% solution in water had a viscosity of 666 centipoises. The reaction efficiency was 12% based on a T.D.E. of 0.50 and an actual D.E. of 0.06. The liquid/starch ratio was 6.3 and the alcohol/water ratio was 4.5 at the beginning of the reaction, the ratios being by weight.

The foregoing examples illustrate the use of the sodium salt of sulfoethyl chloride and sulfoethyl bromide as etherifying agents. The substitution desired is determinative of the quantity of etherifying agent introduced into the reaction, this quantity generally being between 0.10 to 1.5 parts by weight per part of starch. The quantity of alkali required depends upon whether the etherifying agent is added in the form of the salt or as the acid, but will generally be between 0.24 and 1 part by weight per part of starch. Preferably, the alkali is added in the form of an aqueous solution.

The isopropanol, t-butanol, and the mixture of ethanol with benzene or toluene are present in sufficient quantity to provide a liquid to starch ratio of from about 2 to 20 parts of liquid by weight per part of starch. Such ratios permit satisfactory agitation and distribution of the reactants throughout the starch mass. In order to inhibit the formation of the rubbery mass during the etherification, the ratio of the alcohol to water should be sufficiently high so that the product is insoluble in the reaction medium. This ratio may vary between 2 and 10 parts of alcohol (100%) per part of water.

The product obtained by the present process is water-soluble and has the physical form of the original starch. While the examples have illustrated the preparation of sodium sulfoethyl starch, other alkali metal salts of sulfoalkyl starch may be prepared in a similar manner by selecting the proper etherifying agent and alkali. Potassium and lithium hydroxide may be substituted for sodium hydroxide in the present process. Many other variations may be made without departure from the scope of the present invention.

Therefore, I intend to be limited only by the following claim.

I claim:

A slurry process for the preparation of alkali metal salts of sulfoethyl starch which comprises reacting a finely-divided starch with alkali and from 0.10 to 1.5 parts by weight per part of starch of a salt of a halo ethyl sulfonate in a liquid medium comprising water and an alcohol selected from the group consisting of isopropanol and t-butanol, the liquid to starch ratio by weight being from about 2 to 20 parts of liquid per part of starch and the alcohol to water ratio by weight being from 2 to 10 parts of alcohol per part of water.

References Cited in the file of this patent

UNITED STATES PATENTS

| | | |
|---|---|---|
| 1,682,382 | Kranzlein | Aug. 28, 1928 |
| 2,561,418 | Ryan | July 24, 1951 |
| 2,682,535 | Broderick | June 29, 1954 |

FOREIGN PATENTS

| | | |
|---|---|---|
| 715,585 | France | Sept. 28, 1931 |